(12) United States Patent
Shimizu et al.

(10) Patent No.: US 12,645,487 B2
(45) Date of Patent: Jun. 2, 2026

(54) SCADA WEB HMI SYSTEM

(71) Applicant: TMEIC CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 700 days.

(21) Appl. No.: 18/003,920

(22) PCT Filed: Jun. 10, 2021

(86) PCT No.: PCT/JP2021/022153
§ 371 (c)(1),
(2) Date: Dec. 30, 2022

(87) PCT Pub. No.: WO2022/259474
PCT Pub. Date: Dec. 15, 2022

(65) Prior Publication Data
US 2023/0342184 A1 Oct. 26, 2023

(51) Int. Cl.
*G06F 9/46* (2006.01)

(52) U.S. Cl.
CPC .................................. *G06F 9/465* (2013.01)

(58) Field of Classification Search
CPC ....... G06F 9/465; G06F 13/00; G05B 19/042; G05B 19/05; Y02P 90/02; G06Q 10/00
See application file for complete search history.

(56) References Cited

U.S. PATENT DOCUMENTS

| | | | | |
|---|---|---|---|---|
| 6,754,885 B1* | 6/2004 | Dardinski | .............. | G05B 15/02 717/113 |
| 2009/0216341 A1* | 8/2009 | Enkerud | .............. | G05B 19/042 700/83 |
| 2018/0074664 A1* | 3/2018 | Yun | ...................... | G06F 3/04847 |

(Continued)

FOREIGN PATENT DOCUMENTS

| | | |
|---|---|---|
| CN | 112639642 A | 4/2021 |
| EP | 3791236 A1 | 3/2021 |

(Continued)

OTHER PUBLICATIONS

Machine Translation of WO 2021015022 (Year: 2021).*

(Continued)

*Primary Examiner* — Peng Ke
(74) *Attorney, Agent, or Firm* — XSENSUS LLP

(57) ABSTRACT

An object of the present invention is to provide a SCADA web HMI system that can reduce a load for processing input/output signals in a large-scale system. An HMI server apparatus performs three filtering processing. In first filtering processing, in a case where received block data corresponds to a screen currently displayed on a web browser, a set of input/output signals is extracted from the received block data. In second filtering processing, input/output signals each having a value varied from a previous value are extracted from the set of input/output signals extracted in the first filtering processing. In third filtering processing, input/output signals corresponding to display parts arranged in the screen currently displayed on the web browser, are extracted from the input/output signals extracted in the second filtering processing.

14 Claims, 9 Drawing Sheets

(56)                          References Cited

U.S. PATENT DOCUMENTS

| 2022/0107614 A1* | 4/2022 | Pleva | ................... G05B 19/042 |
| 2022/0108262 A1* | 4/2022 | Cella | ...................... G05B 17/02 |

FOREIGN PATENT DOCUMENTS

| JP | 2017-27211 | A | 2/2017 |
| KR | 2019-0007647 | A | 1/2019 |
| KR | 2019-0007647 | A1 | 1/2019 |
| TW | 200632712 | A | 9/2006 |
| TW | 202115552 | A | 4/2021 |
| WO | 2021/015022 | A1 | 1/2021 |

OTHER PUBLICATIONS

Office Action issued on Mar. 8, 2024, in corresponding Indian patent Application No. 202317001140, 7 pages.

International Search Report and Written Opinion mailed on Sep. 7, 2021, received for PCT Application PCT/JP2021/022153, filed on Jun. 10, 2021, 10 pages including English Translation.

Office Action mailed on Nov. 30, 2022, received for TW Application 111110861, 11 pages including Partial English Translation.

Office Action issued on May 30, 2025, in corresponding Chinese patent Application No. 202180047318.3, 16 pages.

* cited by examiner

Fig.4

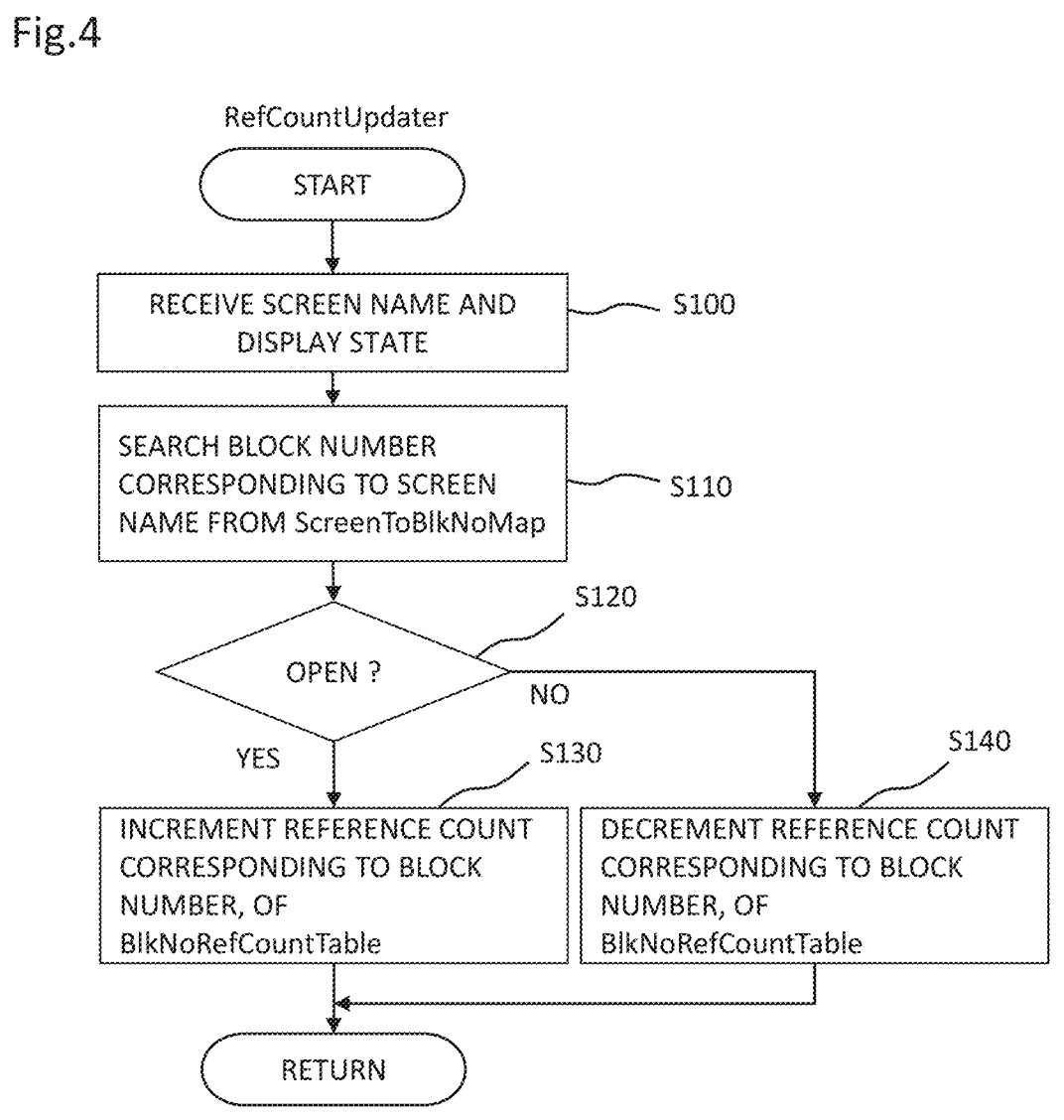

RefCountUpdater

START

RECEIVE SCREEN NAME AND DISPLAY STATE　　S100

SEARCH BLOCK NUMBER CORRESPONDING TO SCREEN NAME FROM ScreenToBlkNoMap　　S110

OPEN ?　　S120

YES

INCREMENT REFERENCE COUNT CORRESPONDING TO BLOCK NUMBER, OF BlkNoRefCountTable　　S130

NO

DECREMENT REFERENCE COUNT CORRESPONDING TO BLOCK NUMBER, OF BlkNoRefCountTable　　S140

RETURN

Fig.6

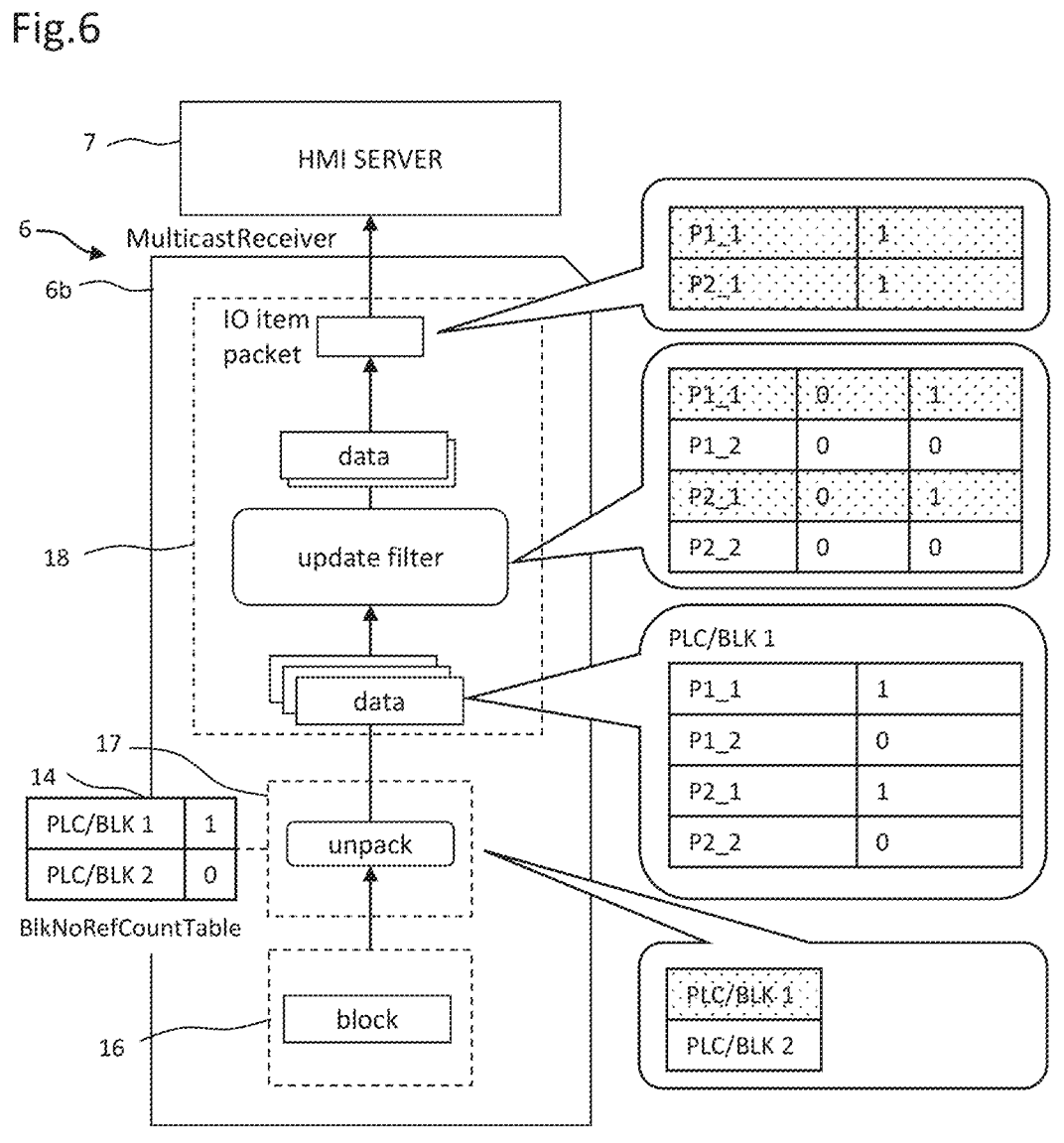

| P1_1 | | 1 |
|---|---|---|
| P2_1 | | 1 |

| P1_1 | 0 | 1 |
|---|---|---|
| P1_2 | 0 | 0 |
| P2_1 | 0 | 1 |
| P2_2 | 0 | 0 |

PLC/BLK 1

| P1_1 | 1 |
|---|---|
| P1_2 | 0 |
| P2_1 | 1 |
| P2_2 | 0 |

| PLC/BLK 1 |
|---|
| PLC/BLK 2 |

HMI SERVER — 7

MulticastReceiver — 6b

5

IO item packet data update filter — 18 data unpack — 17 block — 16

| PLC/BLK 1 | 1 |
|---|---|
| PLC/BLK 2 | 0 |

14

BlkNoRefCountTable

SCADA WEB HMI SYSTEM

CROSS-REFERENCE TO RELATED APPLICATION

The present application is based on PCT filing PCT/JP2021/022153, filed Jun. 10, 2021, the entire contents of which are incorporated herein by reference.

FIELD

The present invention relates to a SCADA web HMI system, and particularly to a technique to reduce a processing load in a large-scale system.

BACKGROUND

A SCADA (Supervisory Control And Data Acquisition) is known as a mechanism to monitor and control a social infrastructure system. Examples of the social infrastructure system include a steel rolling system, a power transmission and transformation system, a water and sewage treatment system, a building management system, and a road system.

The SCADA is a type of an industrial control system, and performs system monitoring, process control, and data collection by a computer. The SCADA is required to have quick responsiveness (real-time property) corresponding to processing performance of the system.

The SCADA commonly includes the following sub-systems.

(1) HMI (Human Machine Interface)

An HMI is a mechanism that presents data on a monitoring object apparatus to an operator, to enable the operator to monitor and control the monitoring object apparatus.

(2) Supervisory Control System

A supervisory control system includes a programmable logic controller (PLC) and the like. The supervisory control system collects data on the monitoring object apparatus, and transmits a control command to the monitoring object apparatus.

(3) Remote Input/Output Apparatus (Remote Input Output: RIO)

A remote input/output apparatus is connected to a sensor installed in the monitoring object apparatus, converts a signal of the sensor into digital data, and transmits the digital data to the supervisory control system.

(4) Communication Base

A communication base connects the supervisory control system and the remote input/output apparatus.

As an example of the SCADA HMI sub-systems, PTL 1 discloses a system including an HMI client apparatus and an HMI server apparatus. In the existing SCADA disclosed in PTL 1, the HMI server apparatus transmits data (input/output signals and alarm signals) received from the PLC to the HMI client apparatus, and stores all of collected data as historical data. The input/output signals are signals relating to the monitoring object apparatus (field apparatuses configuring industrial plant), and include an actuator control signal and a sensor detection signal.

CITATION LIST

Patent Literature

[PTL 1] JP 2017-27211 A

SUMMARY

Technical Problem

Issues in development of an HMI sub-system that is one of the above-described sub-systems are described.

In a large-scale system, the HMI sub-system connects two hundred thousand or more signals to the PLC in some cases. An existing HMI server apparatus performing both of supervisory control and data collection requires a high-performance processor and a large-capacity memory in order to process a number of signals in real time. Therefore, it is desirable to realize the HMI sub-system applicable to the large-scale system at low cost.

To realize cost reduction of the SCADA HMI sub-system, the inventers of the present application developed a browser-based SCADA HMI sub-system. As a result, it is possible to realize an HMI screen as a web application operating on a web browser.

One of advantages of realizing the HMI screen on the web browser is that data can be easily acquired from different web servers by switching a URL (including port number). In other words, it is possible to acquire data on a history screen from an online data gathering apparatus (ODG) that collects and stores all of PLC data, and to acquire data on a supervisory screen requiring real-time property from the HMI server apparatus. A function relating to the history that is a part of a SCADA function is separated and is assigned to the online data gathering apparatus, which enables the HMI server apparatus to be specialized for a real-time supervisory function. To process a number of signals by the HMI server apparatus at low cost, it is desirable to reduce a load for processing the input/output signals (including actuator control signal and sensor detection signal).

The present invention is made to solve the above-described issues, and an object of the present invention is to provide a SCADA web HMI system that can reduce a load for processing input/output signals in a large-scale system.

Solution to Problem

A first aspect relates to a SCADA web HMI system.

A SCADA web HMI system includes a programmable logic controller (hereinafter, PLC), an HMI client apparatus, and an HMI server apparatus that are connected through a computer network.

The PLC periodically transmits, to the computer network, block data including a set of input/output signals relating to field apparatuses configuring an industrial plant.

The HMI client apparatus includes a monitor displaying a web browser, and a client processor configured to execute the web browser displaying a screen including arranged display parts.

In a case where the screen currently displayed on the web browser is a supervisory screen, the web browser changes display states of the display parts based on the input/output signals received from the HMI server apparatus.

The HMI server apparatus includes a server processor configured to perform reception processing, first filtering processing, second filtering processing, third filtering processing, and transmission processing.

In the reception processing, the block data transmitted from the PLC is periodically received.

In the first filtering processing, in a case where the received block data corresponds to the screen currently displayed on the web browser, the set of input/output signals is extracted from the received block data.

In the second filtering processing, the input/output signals each having a value varied from a previous value are extracted from the set of input/output signals extracted in the first filtering processing.

In the third filtering processing, the input/output signals corresponding to the display parts arranged in the screen currently displayed on the web browser are extracted from the input/output signals extracted in the second filtering processing.

In the transmission processing, the input/output signals extracted in the third filtering processing are transmitted to the web browser displayed on the monitor.

A second aspect further includes the following characteristics in addition to the first aspect.

The HMI server apparatus further includes a server memory storing static information and dynamic information. The static information includes information in which correspondence relationship between a screen name of the screen and a block number of the block data is previously determined. The dynamic information includes information in which relationship between the block number and a reference count is determined.

The server processor is further configured to perform reference count update processing.

In the reference count update processing, a changed display state of the screen is received from the HMI client apparatus, and the block number corresponding to the screen is searched from the static information.

In the reference count update processing, the reference count corresponding to the searched block number is incremented in a case where the display state is an open state. In the reference count update processing, the reference count corresponding to the block number is decremented in a case where the display state is a closed state.

In the first filtering processing, it is determined whether the reference current corresponding to the block number of the received block data is greater than zero, based on the dynamic information. In the first filtering processing, in a case where the reference count is greater than zero, the set of input/output signals is extracted from the received block data. In the first filtering processing, in a case where the reference count is less than or equal to zero, the received block data is discarded.

A third aspect further includes the following characteristics in addition to the first or second aspect.

The block data is periodically transmitted from the PLC by multicast or broadcast.

A fourth aspect further includes the following characteristics in addition to the third aspect.

The SCADA web HMI system further includes an online data gathering apparatus.

The online data gathering apparatus periodically receives the block data from the PLC, and stores historical data on all of signals included in the block data.

The online data gathering apparatus transmits the historical data in response to a request from the web browser.

The web browser requests the historical data to the online data gathering apparatus in a case where the screen currently displayed on the web browser is a history screen.

The web browser displays the historical data received from the online data gathering apparatus on the history screen.

Advantageous Effects of Invention

According to the first aspect, unnecessary data (data not relating to screen currently displayed) is discarded by three-stage filtering, to reduce a load by subsequent processing, which makes it possible to minimize an amount of data transmitted to the web browser.

According to the second aspect, managing the reference count makes it possible to realize the first filtering processing at high speed.

According to the third aspect, the apparatus added to the computer network can receive the block data without influencing the existing apparatus.

According to the fourth aspect, the online data gathering apparatus can store the historical data on all of the signals, and the web browser of the HMI client apparatus can acquire the historical data from the online data gathering apparatus. Accordingly, it is sufficient for the HMI server apparatus to process only data necessary for real-time monitoring, which makes it possible to reduce the processing load of the HMI server apparatus.

BRIEF DESCRIPTION OF DRAWINGS

FIG. 4 is a flowchart to explain reference count update processing according to the embodiment of the present invention.

FIG. 6 is a diagram to explain specific examples of the first filtering processing and the second filtering processing according to the embodiment of the present invention.

DESCRIPTION OF EMBODIMENTS

Figure 1:
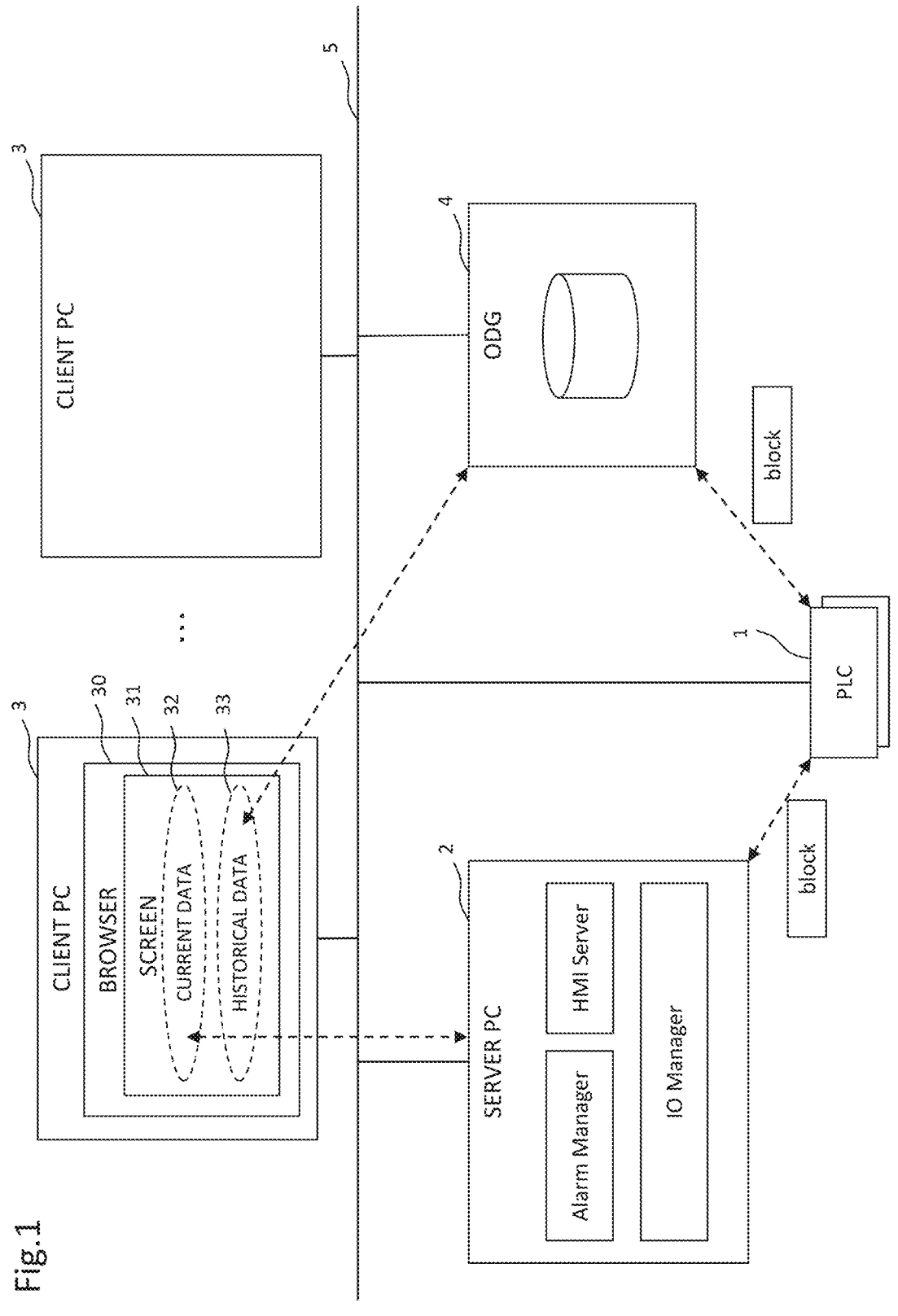
FIG. 1 is a diagram to explain a configuration example of a SCADA web HMI system according to an embodiment of the present invention.

An embodiment of the present invention is described in detail below with reference to drawings. Note that elements common to the drawings are denoted by the same reference numerals, and repetitive descriptions of the elements are omitted.

Embodiment

1. SCADA Web HMI System

FIG. 1 is a diagram to explain a configuration example of a SCADA web HMI system according to an embodiment. The SCADA web HMI system illustrated in FIG. 1 includes a PLC 1, an HMI server apparatus 2, an HMI client apparatus 3, and an online data gathering apparatus (ODG) 4 that are connected to one another through a computer network 5. The computer network 5 is, for example, Ethernet®.

The PLC 1 is connected to field apparatuses (including actuator and sensor) configuring an industrial plant, through an unillustrated control network. The PLC 1 periodically transmits a packet including block data to the computer network 5 by multicast or broadcast. The block data is a set of PLC signals. One piece of block data includes several tens to several hundred PLC signals. Types of the PLC signals include an input/output signal (including actuator control signal and sensor detection signal) and an alarm signal.

The block data is periodically transmitted irrespective of whether a value of each of the PLC signals is varied from a previous value. Therefore, even in a case where the transmitted packet including the block data is lost, the packet is retransmitted in a next transmission period, and the latest state is reflected on the HMI server apparatus 2 and the online data gathering apparatus 4.

The HMI client apparatus 3 includes a processor 71, a memory 72, and a monitor 75 illustrated in FIG. 9 described below. The processor 71 is configured to execute a web browser 30 displaying a screen 31 on which display parts are arranged, by executing programs stored in the memory 72. The monitor 75 displays the web browser 30.

The web browser 30 can switch a connection destination (HMI server apparatus 2 or online data gathering apparatus 4) based on a URL, and can acquire various kinds of information on an HTML document about the screen 31 from a web server designated by the URL. The screen 31 includes a supervisory screen 32 requiring real-time property, and a history screen 33 displaying historical data.

In a case where the screen 31 currently displayed on the web browser 30 is the supervisory screen 32, the web browser 30 changes display states of the display parts based on input/output signals received from the HMI server apparatus 2. The change in the display state is change in, for example, numerical value, character, color, and shape.

In a case where the screen 31 currently displayed on the web browser 30 is the history screen, the web browser 30 issues a historical data request to the online data gathering apparatus 4. The web browser 30 displays historical data received from the online data gathering apparatus 4, on the history screen 33.

The online data gathering apparatus 4 includes a processor 81 and a memory 82 illustrated in FIG. 9 described below. The processor 81 is configured to execute web server processing and historical data management processing by executing programs stored in the memory 82.

The online data gathering apparatus 4 periodically receives block data from the PLC 1. In the historical data management processing by the online data gathering apparatus 4, historical data on all of signals included in the received block data is stored in the memory 82 (including database). In the web server processing by the online data gathering apparatus 4, the historical data is transmitted in response to the request from the web browser 30.

2. Overview of Functions of HMI Server Apparatus

Figure 2:
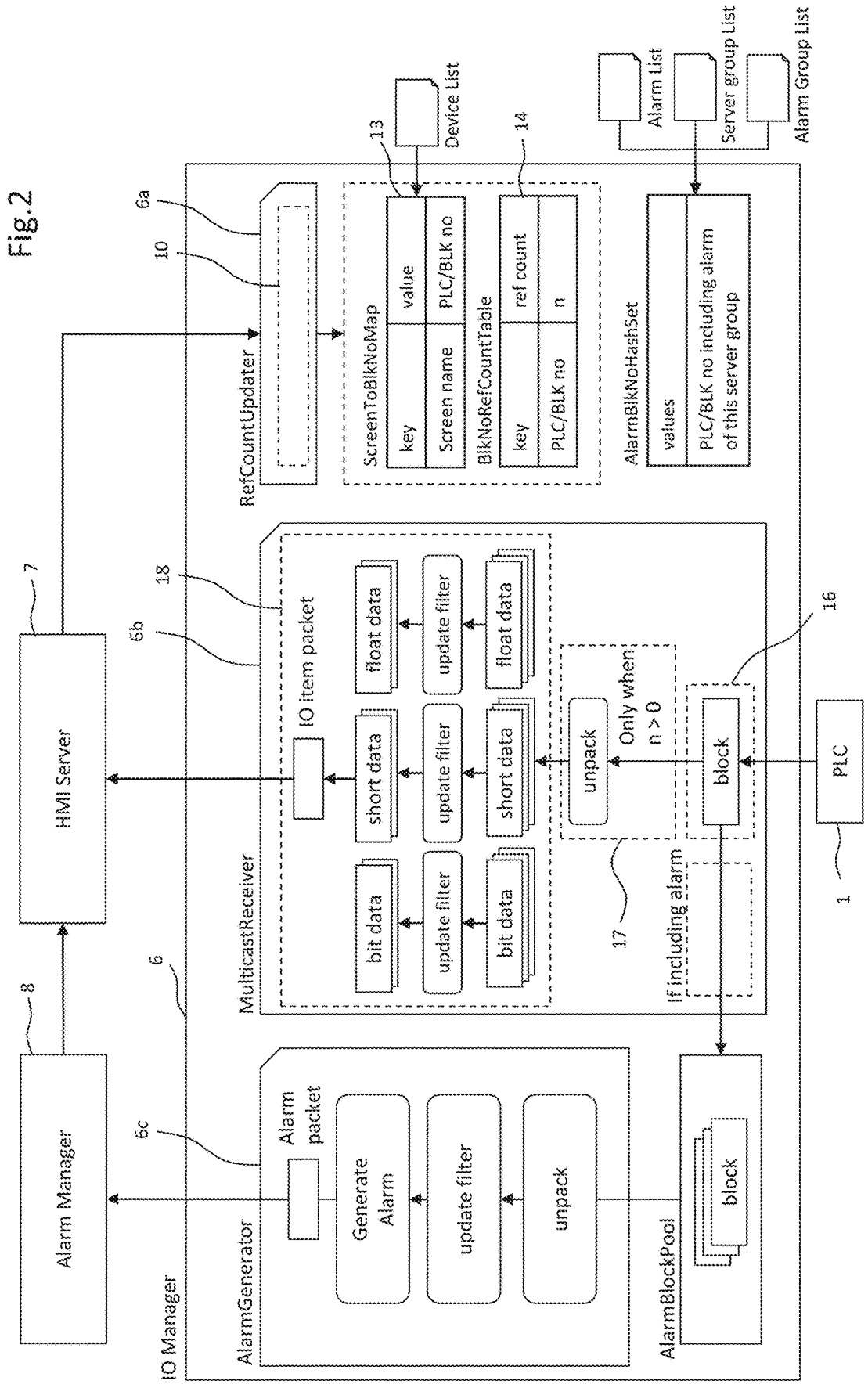
FIG. 2 is a block diagram illustrating overview of functions held by an HMI server apparatus according to the embodiment of the present invention.
Figure 3:
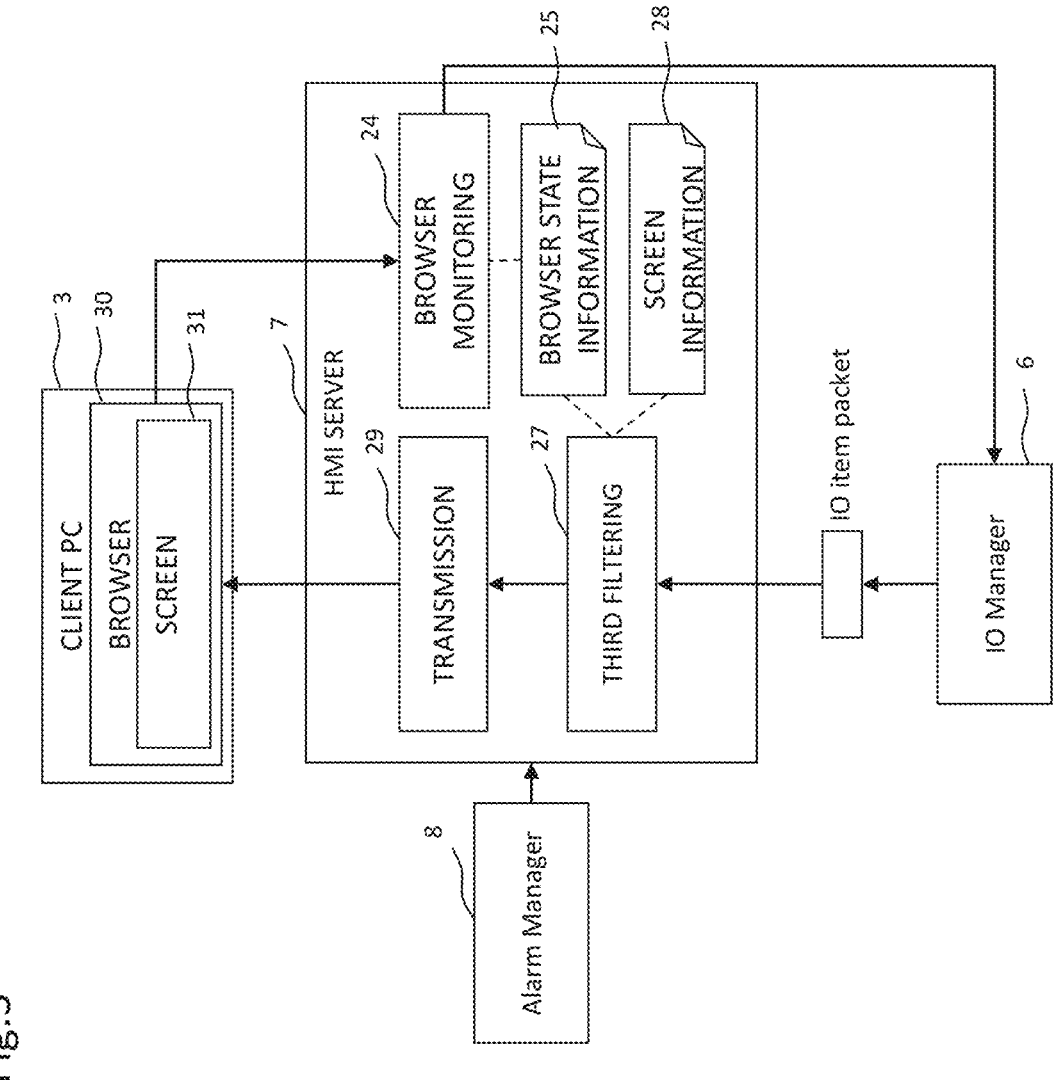
FIG. 3 is a block diagram illustrating overview of the functions held by the HMI server apparatus according to the embodiment of the present invention.

FIG. 2 and FIG. 3 are block diagrams each illustrating overview of functions held by the HMI server apparatus 2 according to the embodiment. The HMI server apparatus 2 includes a processor 61 and a memory 62 illustrated in FIG. 9 described below. The processor 61 performs various kinds of processing, and the memory 62 stores various kinds of information. The processor 61 executes an input/output management process 6, an HMI server process 7, an alarm management process 8, and the like by executing programs stored in the memory 62. The input/output management process 6, the HMI server process 7, and the alarm management process 8 can mutually exchange data through interprocess communication. The input/output management process 6 executes a reference count update thread 6a, a multicast receiver thread 6b, and an alarm generation thread 6c in parallel.

The input/output management process 6 illustrated in FIG. 2 periodically receives block data from the PLC 1, extracts, from the block data, only input/output signals relating to the screen 31 currently displayed on the web browser 30, and transmits the input/output signals to the HMI server process 7.

The input/output management process 6 performs reference count update processing 10, reception processing 16, first filtering processing 17, and second filtering processing 18.

In the reference count update processing 10, first filtering information to specify block data corresponding to the screen 31 currently displayed on the web browser 30 is managed. The first filtering information includes static information 13 and dynamic information 14, and is stored in the memory 62. The static information 13 (ScreenToBlkNoMap) is information in which correspondence relationship between a screen name and a block number is previously determined. The dynamic information 14 (BlkNoRefCountTable) is information in which relationship between the block number and a reference count is determined.

In the reception processing 16, the block data transmitted from the PLC 1 is periodically received. The period is, for example, several milliseconds to several hundred milliseconds.

In the first filtering processing 17, in a case where the received block data corresponds to the screen 31 currently displayed on the web browser 30, a set of input/output signals is extracted from the received block data.

In the second filtering processing 18, input/output signals each having a value varied from a previous value are extracted from the set of input/output signals extracted in the first filtering processing 17.

The HMI server process 7 illustrated in FIG. 3 performs web server processing, browser monitoring processing 24, third filtering processing 27, and transmission processing 29.

In the browser monitoring processing 24, a state of the web browser executed by the HMI client apparatus 3 is monitored, and the state of the web browser 30 is recorded in browser state information 25. The browser state information 25 includes information in which correspondence relationship between a name of the web browser 30 and a name of the screen 31 currently displayed on the web browser 30 is determined, and is stored in the memory 62. Further, in the browser monitoring processing 24, a screen open/close signal including a screen name and a display state (open state or closed state) of the screen 31 changed in display state on the web browser 30 is transmitted to the input/output management process 6.

In the third filtering processing 27, input/output signals corresponding to display parts arranged in the screen 31 currently displayed on the web browser 30 are extracted from the input/output signals extracted in the second filtering processing 18.

Figure 9:
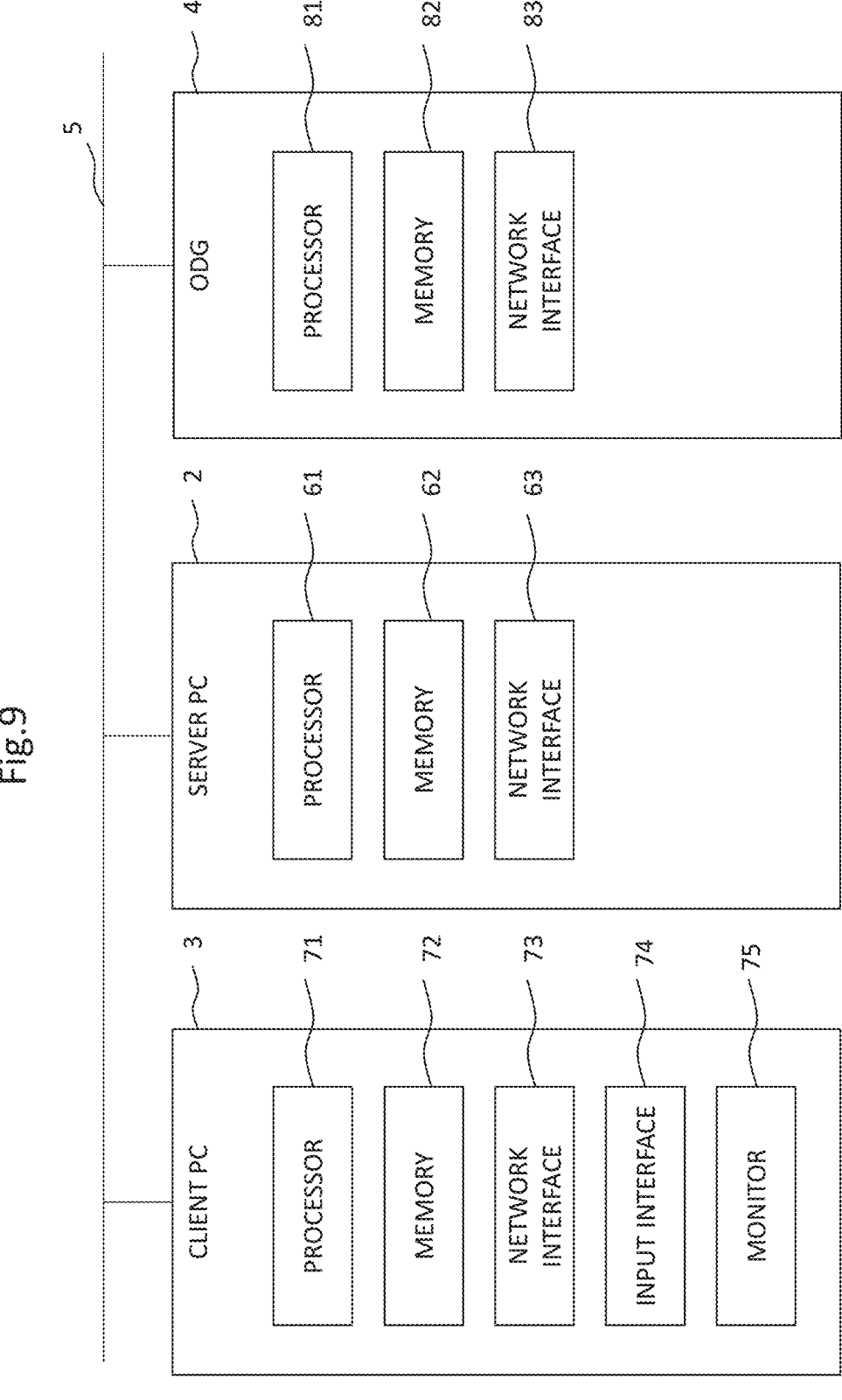
FIG. 9 is a block diagram illustrating hardware configuration examples of the HMI server apparatus, an HMI client apparatus, and an online data gathering apparatus.

In the transmission processing 29, the input/output signals extracted in the third filtering processing 27 are transmitted to the web browser 30 displayed on the monitor 75 (FIG. 9).

3. Reference Count Update Processing

FIG. 4 is a flowchart to explain the reference count update processing 10 (FIG. 2). A flow illustrated in FIG. 4 is repeatedly performed for every predetermined cycle.

As an example, it is assumed that the screen 31 (screen name "G1") is newly displayed on the web browser 30 of the HMI client apparatus 3. At this time, in the browser monitoring processing 24, the screen open/close signal including the screen name "G1" and the display state "open state" is transmitted to the input/output management process 6 (reference count update processing 10).

In step S100, in the reference count update processing 10, the screen open/close signal including the screen name and the display state is received from the HMI server process 7 (browser monitoring processing 24).

In the above-described example, in the reference count update processing 10, the screen name "G1" and the display state "open state" are received.

In step S110, in the reference count update processing 10, a block number corresponding to the screen name is searched from the above-described static information 13.

For example, it is assumed that correspondence relationship between the screen name "G1" and a block number "PLC/BLK 1" is previously determined in the static information 13. In this case, in the reference count update processing 10, "PLC/BLK 1" is searched as the block number on the block data relating to the screen name "G1".

In step S120, in the reference count update processing 10, it is determined whether the display state of the screen open/close signal is the open state or the closed state. In a case where the display state is the open state, processing in step S130 is performed. In a case where the display state is the closed state, processing in step S140 is performed.

In the case where the display state is the open state, in the reference count update processing 10, a reference count corresponding to the searched block number, of the dynamic information 14 is incremented in step S130.

In the above-described example, in a case where the display state of the screen name "G1" is the "open state", a reference count corresponding to the block number "PLC/BLK 1" is incremented and is changed from "0" to "1".

In the case where the display state is the closed state, in the reference count update processing 10, the reference count corresponding to the searched block number, of the dynamic information 14 is decremented in step S140.

Note that in a case where the display state of the screen "G1" is the "opened state" on a certain web browser 30 and the display state of the screen "G1" is also the "opened state" on another web browser 30, the reference count is incremented and is changed from "1" to "2".

4. First Filtering Processing and Second Filtering Processing

Figure 5:
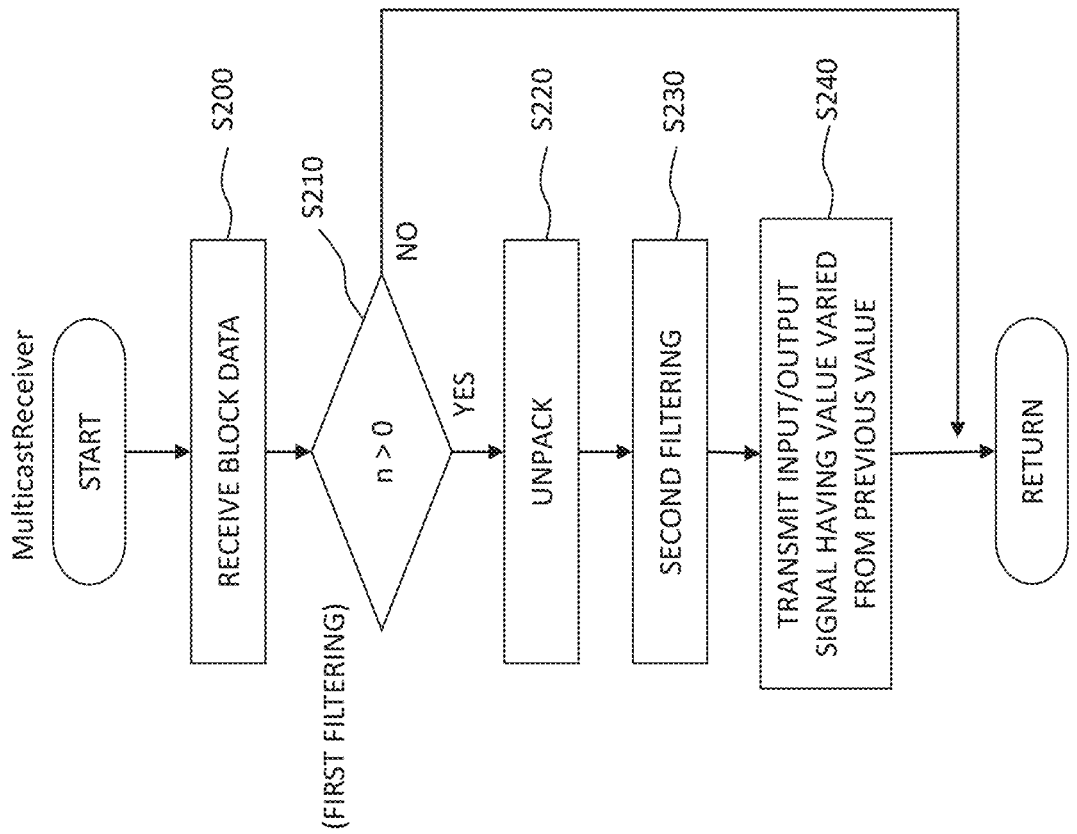
FIG. 5 is a flowchart to explain first filtering processing and second filtering processing according to the embodiment of the present invention.

Next, the first filtering processing 17 and the second filtering processing 18 illustrated in FIG. 2 are described with reference to FIG. 5 and FIG. 6. FIG. 5 is a flowchart to explain the first filtering processing 17 and the second filtering processing 18. FIG. 6 is a diagram to explain specific examples of the first filtering processing 17 and the second filtering processing 18. A flow illustrated in FIG. 5 is repeatedly performed for every predetermined cycle.

In step S200, in the reception processing 16, the block data transmitted from the PLC 1 is periodically received.

In the example illustrated in FIG. 6, in the reception processing 16, the block data (block number "PLC/BLK 1") is received in a period of a first time, and the block data (block number "PLC/BLK 2") is received in a period of a second time.

In step S210, in the first filtering processing 17, it is determined whether a reference count n corresponding to the block number of the received block data is greater than zero, based on the dynamic information 14. As a result, only the block data having the reference count n greater than zero is extracted. In a case where the reference count n is greater than zero, processing in step S220 is performed on the received block data. In contrast, in a case where the reference count n is less than or equal to zero, the received block data is discarded, and the flow is terminated. In a case where the determination condition in step S210 is not established, the input/output signals included in the block data are not displayed on any web browser 30. Therefore, it is possible to discard the block data and to reduce a load by the subsequent processing.

In the example illustrated in FIG. 6, the reference count n relating to the block data (block number "PLC/BLK 1") is one in the dynamic information 14, and the determination condition in step S210 is accordingly established. Therefore, the processing in step S220 is then performed on the block data. In contrast, the reference count n relating to the block data (block number "PLC/BLK 2") is zero in the dynamic information 14. Therefore, the block data is discarded, and reception of next block data is waited.

In step S220, in the first filtering processing 17, the received block data is unpacked, and a set of input/output signals is extracted from the block data. Note that types of values of the input/output signals include a bit type, an integer type, and a floating point type (FIG. 2).

In the example illustrated in FIG. 6, the block data (block number "PLC/BLK 1") is unpacked, and four input/output signals (P1_1, P1_2, P2_1, and P2_2) each having a bit-type value are extracted.

In step S230, in the second filtering processing 18, only input/output signals each having a value varied from a previous value are extracted from the set of input/output signals extracted in the first filtering processing 17, based on second filtering information. The second filtering information includes previous values of the respective input/output signals included in the block data, and is stored in the memory 62. In a case where the previous value and the current value (latest value) of an input/output signal are different from each other, it is necessary to reflect the variation on the screen 31 currently displayed. Therefore, it is necessary to transmit the input/output signal varied in value to the HMI server process 7. In contrast, in a case where the previous value and the current value of the input/output signal are equal to each other, the displayed contents of the screen 31 currently displayed are not changed. Therefore, it is possible to discard the input/output signal, and to reduce the load by the subsequent processing.

In the example illustrated in FIG. 6, out of the above-described four input/output signals (P1_1, P1_2, P2_1, and P2_2), two input/output signals (P1 1 and P2 1) are signals each having a value varied from the previous value. In contrast, remaining two input/output signals (P1_2 and P2_2) are discarded because the previous value and the current value are equal to each other.

In step S240, in the second filtering processing 18, the input/output signals each having a value varied from the previous value are transmitted to the HMI server process 7.

In the example illustrated in FIG. 6, the two input/output signals P1 1 and P2 1 are transmitted to the HMI server process 7.

5. Third Filtering Processing

Figure 7:
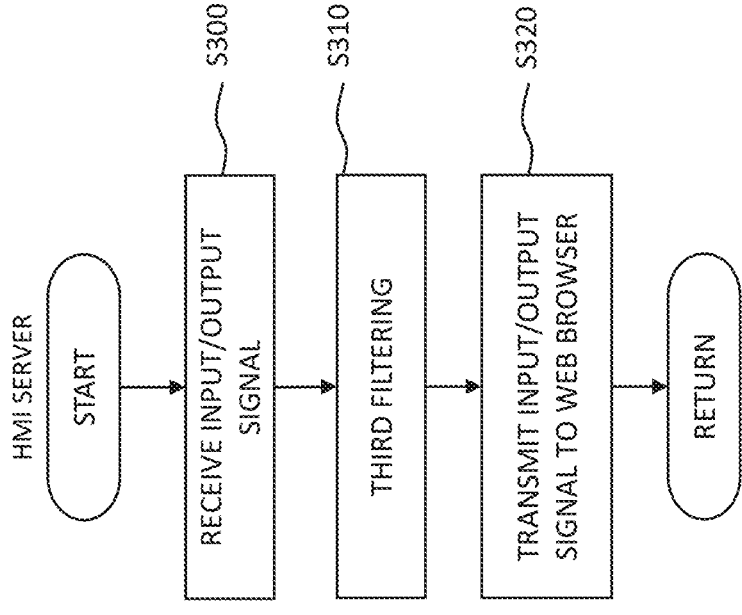
FIG. 7 is a flowchart to explain third filtering processing according to the embodiment of the present invention.
Figure 8:
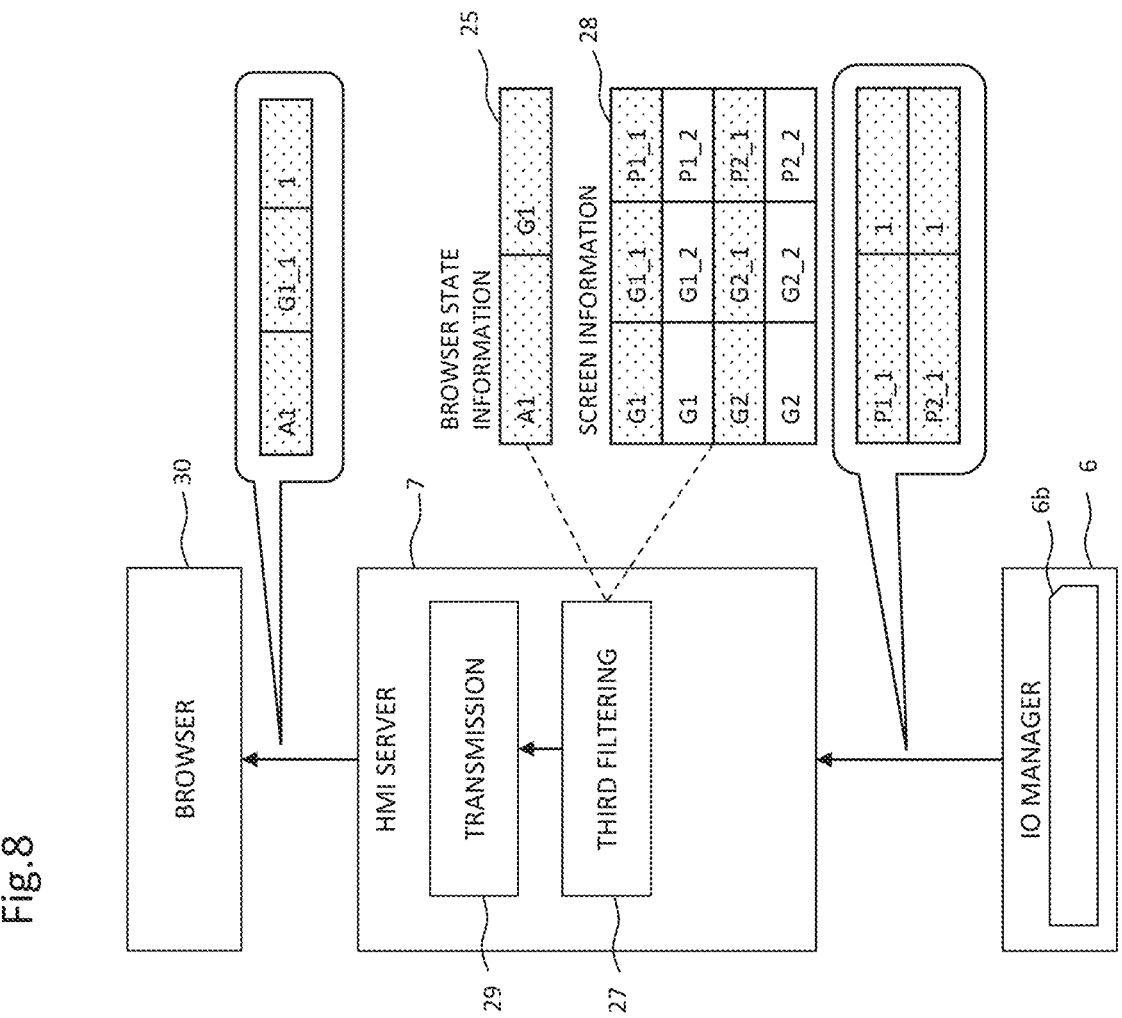
FIG. 8 is a diagram to explain a specific example of the third filtering processing according to the embodiment of the present invention.

Next, the third filtering processing 27 illustrated in FIG. 3 is described with reference to FIG. 7 and FIG. 8. FIG. 7 is a flowchart to explain the third filtering processing 27. FIG. 8 is a diagram to explain a specific example of the third filtering processing 27. A flow illustrated in FIG. 7 is repeatedly performed for every predetermined cycle.

In step S300, the HMI server process 7 receives the input/output signals extracted in the second filtering processing 18 of the input/output management process 6.

In the example of FIG. 8, the two input/output signals (P1 1 and P2 1) are input.

Next, in step S310, the third filtering processing 27 is performed. In the third filtering processing 27, third filtering information is used. The third filtering information includes the browser state information 25 and screen information 28, and is stored in the memory 62. The browser state information 25 includes the information in which the correspondence relationship between the name of the web browser 30 and the name of the screen 31 currently displayed on the web browser 30 is determined. The screen information 28 includes information in which a screen name of the screen 31, part names of display parts arranged in the screen 31, and input/output signal names of the input/output signals changing states of the respective display parts are previously associated for each of all screens. Note that the display part name and the input/output signal name may be the same as each other.

More specifically, in the third filtering processing 27, display part names and a screen name corresponding to the input/output signals extracted in the second filtering processing 18 are first searched based on the screen information 28. Further, in the third filtering processing 27, a web browser name corresponding to the searched screen name is searched based on the browser state information 25. In the third filtering processing 27, input/output signals corresponding to the display parts arranged in the screen 31 currently displayed on the web browser 30 are extracted from the input/output signals extracted in the second filtering processing 18, based on results of the search.

In the example illustrated in FIG. 8, a display part name corresponding to the input/output signal "P1_1" is "G1_1", and a screen name is "G1". Further, a display part name corresponding to the input/output signal "P2_1" is "G2_1", and a screen name is "G2". A state where the screen 31 (screen name "G1") is currently displayed on the web browser 30 (web browser name "A1") is registered in the browser state information 25. Therefore, only the input/output signal (input/output signal name "P1_1") corresponding to the display part (display part name "G1_1") arranged in the screen 31 (screen name "G1") is information necessary for display. In contrast, the input/output signal (input/output signal name "P2_1") not relating to the screen 31 (screen name "G1") currently displayed is not displayed on any web browser 30. Therefore, it is possible to discard the input/output signal, and to reduce the load by the subsequent processing.

In step S320, in the transmission processing 29, the input/output signals extracted in the third filtering processing 27 are transmitted to the web browser 30 displayed on the monitor 75 (FIG. 9).

In the example illustrated in FIG. 8, only the input/output signal (input/output signal name "P1_1") corresponding to the display part (display part name "G1_1") of the screen 31 currently displayed is transmitted to the web browser 30 (web browser name "A1").

6. Effects

As described above, the HMI server apparatus 2 performs the above-described three filtering processing before the input/output signals are displayed on the screen 31 of the web browser 30.

According to the first filtering processing, it is possible to extract only the block data relating to the screen 31 currently displayed on the web browser 30. Unnecessary block data can be discarded in a reception stage. Therefore, an effect of reducing the processing load is large especially in a large-scale system.

According to the second filtering processing, it is possible to extract only the input/output signals each having a value varied from a previous value. According to the third filtering processing, it is possible to extract only the input/output signals relating to the display parts arranged in the screen 31 currently displayed on the web browser 30. Accordingly, in each of the filtering processing, unnecessary data (data not relating to screen currently displayed) can be discarded to reduce the load by the subsequent processing, which makes it possible to reduce an amount of data transmitted to the web browser.

Further, the online data gathering apparatus 4 can store the historical data on all of the signals, and the web browser 30 of the HMI client apparatus 3 can acquire the historical data from the online data gathering apparatus 4. Therefore, it is sufficient for the HMI server apparatus 2 to process only data necessary for the real-time monitoring. This makes it possible to reduce the processing load of the HMI server apparatus.

7. Hardware Configuration Example

FIG. 9 is a block diagram illustrating hardware configuration examples of the HMI server apparatus 2, the HMI client apparatus 3, and the online data gathering apparatus 4.

The above-described processing of the HMI server apparatus 2 is realized by a processing circuit. The processing circuit includes the processor 61, the memory 62, and a network interface 63 that are connected to one another. The processor 61 realizes the functions of the HMI server apparatus 2 by executing various kinds of programs stored in the memory 62. The memory 62 includes a main storage device and an auxiliary storage device.

The above-described processing of the HMI client apparatus 3 is realized by a processing circuit. The processing circuit includes the processor 71, the memory 72, a network interface 73, an input interface 74, and at least one monitor 75 that are connected to one another. The processor 71 realizes the functions of the HMI client apparatus 3 by executing various kinds of programs stored in the memory 72. The memory 72 includes a main storage device and an auxiliary storage device. The input interface 74 includes an input device such as a keyboard, a mouse, and a touch panel. A plurality of monitors 75 may be provided.

The above-described processing of the online data gathering apparatus 4 is realized by a processing circuit. The processing circuit includes the processor 81, the memory 82, and a network interface 83 that are connected to one another. The processor 81 realizes the functions of the online data gathering apparatus 4 by executing various kinds of programs stored in the memory 82. The memory 82 includes a main storage device and an auxiliary storage device.

Although the embodiments of the present invention have been described above, the present invention is not limited to the above-described embodiments, and can be implemented while being variously modified without departing from the gist of the present invention. When the number, quantity, amount, range, or other numerical attribute of each element is mentioned in the above-described embodiments, the present invention is not limited to the mentioned numerical attribute unless it is expressly stated or theoretically defined. Further, the structures and the like described in the above-described embodiments are not necessarily essential to the present invention unless expressly stated or theoretically defined.

REFERENCE SIGNS LIST

1 Programmable logic controller (PLC)
2 HMI server apparatus
3 HMI client apparatus
4 Online data gathering apparatus
5 Computer network
6 Input/output management process
6a Reference count update thread
6b Multicast receiver thread
6c Alarm generation thread
7 HMI server process
8 Alarm management process
10 Reference count update processing
13 Static information
14 Dynamic information
16 Reception processing
17 First filtering processing
18 Second filtering processing
24 Browser monitoring processing
25 Browser state information
27 Third filtering processing
28 Screen information
29 Transmission processing
30 Web browser
31 Screen
32 Supervisory screen
33 History screen
61, 71, 81 Processor
62, 72, 82 Memory
63, 73, 83 Network interface
74 Input interface
75 Monitor

The invention claimed is:

1. A Supervisory Control And Data Acquisition (SCADA) web Human Machine Interface (HMI) system comprising:
   a Programmable Logic Controller (PLC) configured to transmit, to a computer network of the SCADA web HMI system, block data including a set of input/output signals relating to field apparatuses configuring an industrial plant;
   an HMI client apparatus that includes a monitor displaying a web browser, and a client processing circuit configured to execute the web browser displaying a screen including arranged display parts; and
   an HMI server apparatus that includes a server processing circuit,
   wherein, in a case where the screen currently displayed on the web browser is a supervisory screen, the client processing circuit controls the web browser to change display states of the display parts based on the input/output signals received from the HMI server apparatus, and
   wherein the server processing circuit of the HMI server apparatus is configured to perform, to reduce processing load on the server processing circuit:

reception processing to periodically receive the block data transmitted from the PLC;
   first filtering processing to extract, in a case where the received block data corresponds to the screen currently displayed on the web browser, the set of input/output signals from the received block data;
   second filtering processing to extract the input/output signals each having a value varied from a previous value, from the set of input/output signals extracted in the first filtering processing;
   third filtering processing to extract the input/output signals corresponding to the display parts arranged in the screen currently displayed on the web browser, from the input/output signals extracted in the second filtering processing; and
   transmission processing to transmit the input/output signals extracted in the third filtering processing, to the web browser displayed on the monitor, the input/output signals extracted in the third filtering processing being target data for real time monitoring by the supervisory screen on the web browser displayed by the monitor of the HMI client apparatus.

2. The SCADA web HMI system according to claim 1, wherein
   the HMI server apparatus further includes a server memory storing static information in which correspondence relationship between a screen name of the screen and a block number of the block data is previously determined, and dynamic information in which relationship between the block number and a reference count is determined,
   wherein the server processing circuit is further configured to perform reference count update processing in which a changed display state of the screen is received from the HMI client apparatus, the block number corresponding to the screen is searched from the static information, the reference count corresponding to the searched block number is incremented in a case where the display state is an open state, and the reference count corresponding to the block number is decremented in a case where the display state is a closed state, and
   wherein in the first filtering processing,
   it is determined whether the reference current corresponding to the block number of the received block data is greater than zero, based on the dynamic information,
   in a case where the reference count is greater than zero, the set of input/output signals is extracted from the received block data, and
   in a case where the reference count is less than or equal to zero, the received block data is discarded.

3. The SCADA web HMI system according to claim 1, wherein the block data is periodically transmitted from the PLC by multicast or broadcast.

4. The SCADA web HMI system according to claim 3, further comprising an online data gathering apparatus,
   wherein the online data gathering apparatus periodically receives the block data from the PLC, stores historical data on all of signals included in the block data, and transmits the historical data in response to a request from the web browser, and
   wherein the client processing circuit controls the web browser to request the historical data to the online data gathering apparatus in a case where the screen currently displayed on the web browser is a history screen, and displays the historical data received from the online data gathering apparatus on the history screen.

5. The SCADA web HMI system according to claim 1, wherein, the client processing circuit controls the web browser to change the display states of the display parts in at least one of a numerical value, character, color, or shape, based on the input/output signals received from the HMI server apparatus.

6. The SCADA web HMI system according to claim 2, wherein
the server memory stores the dynamic information as a block number reference count table, and
the server processing circuit is configured to update the reference count table in real-time as the display state of the screen on the HMI client apparatus changes between the open state and the closed state.

7. The SCADA web HMI system according to claim 2, wherein the server processing circuit is configured to perform the first filtering processing in a reception stage of the HMI server apparatus to discard unnecessary block data before the block data is unpacked.

8. The SCADA web HMI system according to claim 2, wherein the static information includes a screen-to-block-number map that pre-associates a plurality of different screen names with corresponding block numbers of the block data transmitted by the PLC.

9. An HMI server apparatus of Supervisory Control And Data Acquisition (SCADA) web Human Machine Interface (HMI) system comprising:
circuitry configured to perform, to reduce processing load on the server processing circuit:
reception processing to periodically receive block data transmitted from a Programmable Logic Controller (PLC), the PLC transmitting, to a computer network of the SCADA web HMI system, block data including a set of input/output signals relating to field apparatuses configuring an industrial plant, the SCADA web HMI system including an HMI client apparatus that includes a monitor displaying a web browser, and a client processing circuit configured to execute the web browser displaying a screen including arranged display parts, and the client processing circuit controlling the web browser to change display states of the display parts based on the input/output signals received from the HMI server apparatus, in a case where the screen currently displayed on the web browser is a supervisory screen;
first filtering processing to extract, in a case where the received block data corresponds to the screen currently displayed on the web browser, the set of input/output signals from the received block data;
second filtering processing to extract the input/output signals each having a value varied from a previous value, from the set of input/output signals extracted in the first filtering processing;
third filtering processing to extract the input/output signals corresponding to the display parts arranged in the screen currently displayed on the web browser, from the input/output signals extracted in the second filtering processing; and
transmission processing to transmit the input/output signals extracted in the third filtering processing, to the web browser displayed on the monitor, the input/output signals extracted in the third filtering processing being target data for real time monitoring by the supervisory screen on the web browser displayed by the monitor of the HMI client apparatus.

10. The HMI server apparatus according to claim 9, further comprising a server memory storing static information in which correspondence relationship between a screen name of the screen and a block number of the block data is previously determined, and dynamic information in which relationship between the block number and a reference count is determined,
wherein the circuitry is further configured to perform reference count update processing in which a changed display state of the screen is received from the HMI client apparatus, the block number corresponding to the screen is searched from the static information, the reference count corresponding to the searched block number is incremented in a case where the display state is an open state, and the reference count corresponding to the block number is decremented in a case where the display state is a closed state, and
wherein in the first filtering processing,
it is determined whether the reference current corresponding to the block number of the received block data is greater than zero, based on the dynamic information,
in a case where the reference count is greater than zero, the set of input/output signals is extracted from the received block data, and
in a case where the reference count is less than or equal to zero, the received block data is discarded.

11. The HMI server apparatus according to claim 9, wherein the block data is periodically transmitted from the PLC by multicast or broadcast.

12. The HMI server apparatus according to claim 11, wherein SCADA web HMI system further comprises an online data gathering apparatus,
wherein the block data is periodically received at the online data gathering apparatus from the PLC, and historical data on all of signals included in the block data is stored at the online data gathering apparatus, and the historical data is transmitted from the online data gathering apparatus in response to a request from the web browser, and
wherein the web browser is controlled by the client processing circuit to request the historical data to the online data gathering apparatus in a case where the screen currently displayed on the web browser is a history screen, and the historical data received from the online data gathering apparatus is displayed on the history screen.

13. The HMI server apparatus according to claim 9, wherein, the web browser is controlled by the client processing circuit to change the display states of the display parts in at least one of a numerical value, character, color, or shape, based on the input/output signals received from the HMI server apparatus.

14. A method for HMI server apparatus of Supervisory Control And Data Acquisition (SCADA) web Human Machine Interface (HMI) system comprising:
periodically receiving block data transmitted from a Programmable Logic Controller (PLC), the PLC transmitting, to a computer network of the SCADA web HMI system, block data including a set of input/output signals relating to field apparatuses configuring an industrial plant, the SCADA web HMI system including an HMI client apparatus that includes a monitor displaying a web browser, and a client processing circuit configured to execute the web browser displaying a screen including arranged display parts, and the client processing circuit controlling the web browser to change display states of the display parts based on the input/output signals received from the HMI server apparatus, in a case where the screen currently displayed on the web browser is a supervisory screen;

performing a first filtering process to extract, in a case where the received block data corresponds to the screen currently displayed on the web browser, the set of 5 input/output signals from the received block data;

performing a second filtering processing to extract the input/output signals each having a value varied from a previous value, from the set of input/output signals extracted in the first filtering processing; 10 performing a third filtering processing to extract the input/output signals corresponding to the display parts arranged in the screen currently displayed on the web browser, from the input/output signals extracted in the second filtering processing; and 15 transmitting the input/output signals extracted in the third filtering processing, to the web browser displayed on the monitor, the input/output signals extracted in the third filtering processing being target data for real time monitoring by the supervisory screen on the web 20 browser displayed by the monitor of the HMI client apparatus.

* * * * *